United States Patent
Matsui et al.

(10) Patent No.: US 9,086,591 B2
(45) Date of Patent: Jul. 21, 2015

(54) LIQUID CRYSTAL DISPLAY DEVICE COMPRISING AN ALIGNMENT FILM SUBJECTED TO AN OPTICAL ALIGNMENT TREATMENT AND HAVING A PHOTOCONDUCTIVE CHARACTERISTIC

(71) Applicant: Japan Display Inc., Tokyo (JP)

(72) Inventors: Chikae Matsui, Mobara (JP); Noboru Kunimatsu, Chiba (JP); Hidehiro Sonoda, Mobara (JP)

(73) Assignee: Japan Display Inc., Tokyo (JP)

( * ) Notice: Subject to any disclaimer, the term of this patent is extended or adjusted under 35 U.S.C. 154(b) by 189 days.

(21) Appl. No.: 13/675,417

(22) Filed: Nov. 13, 2012

(65) Prior Publication Data

US 2013/0128187 A1    May 23, 2013

(30) Foreign Application Priority Data

Nov. 21, 2011    (JP) ................. 2011-253587

(51) Int. Cl.
    *G02F 1/1337*    (2006.01)
    *G02F 1/1335*    (2006.01)
    *G02F 1/13*      (2006.01)
    *G02F 1/1333*    (2006.01)

(52) U.S. Cl.
    CPC ........ *G02F 1/133602* (2013.01); *G02F 1/1303* (2013.01); *G02F 1/133788* (2013.01); *G02F 2001/133388* (2013.01); *G02F 2001/133397* (2013.01)

(58) Field of Classification Search
    CPC .................. G02F 1/133602; G02F 1/1303
    USPC .................................. 349/123–136
    See application file for complete search history.

(56) References Cited

U.S. PATENT DOCUMENTS

| | | | |
|---|---|---|---|
| 2002/0018149 A1* | 2/2002 | Kanayama | 349/1 |
| 2003/0076452 A1* | 4/2003 | Kim et al. | 349/43 |
| 2006/0061719 A1 | 3/2006 | Tomioka et al. | |
| 2010/0066961 A1* | 3/2010 | Matsui et al. | 349/129 |

FOREIGN PATENT DOCUMENTS

| | | |
|---|---|---|
| JP | 2004-206091 A | 7/2004 |
| JP | 2010-072011 A | 4/2010 |
| JP | 2010-72011 A | 4/2010 |

* cited by examiner

*Primary Examiner* — Paul Lee
(74) *Attorney, Agent, or Firm* — Ulmer & Berne LLP (57) ABSTRACT

A high quality liquid crystal display device has an alignment film with a photoconductive characteristic. Since a region having gate lines situated therebelow does not undergo irradiation of a backlight, no photoconductive effect can be obtained. A photoresist is disposed below the alignment film situated over the gate lines in order to transfer the charges in the region to an opening portion of the alignment film in an early stage. Since the photoresist has a thickness of about 1.5 μm, which is 20 times or more the 70 nm thickness of the alignment film, the resistance in the lateral direction is low in a portion where the photoresist is present. Accordingly, since the charges on the alignment film present over the gate line transfer to the opening portion of the alignment film and are eliminated in an early stage, the residual image is eliminated in the early stage.

8 Claims, 10 Drawing Sheets

EFFECTIVE REGION

LIQUID CRYSTAL DISPLAY DEVICE COMPRISING AN ALIGNMENT FILM SUBJECTED TO AN OPTICAL ALIGNMENT TREATMENT AND HAVING A PHOTOCONDUCTIVE CHARACTERISTIC

CLAIM OF PRIORITY

The present application claims priority from Japanese Patent Application JP 2011-2535287 filed on Nov. 21, 2011, the content of which is hereby incorporated by reference into this application.

BACKGROUND OF THE INVENTION

1. Field of the Invention

The present invention relates to a liquid crystal display device, and particularly relates to a liquid crystal display device having a liquid crystal display panel of which alignment film is provided with alignment controllability by irradiation of light.

2. Description of the Related Art

Liquid crystal display devices include a TFT substrate having pixel electrodes, thin film transistors (TFT), etc. formed in a matrix; a counter substrate disposed in facing relation to the TFT substrate and having color filters, etc. formed at positions corresponding to the pixel electrodes of the TFT substrate; and liquid crystals put between the TFT substrate and the counter substrate. Images are formed by controlling the light transmittance of liquid crystal molecules of each pixel.

Since the liquid crystal display devices are flat and light in weight, their application use has been extended in various fields, for example, from large-sized display devices such as television sets to mobile phones and DEC (Digital. Still Cameras). The liquid crystal display devices involve a problem about a viewing angle characteristic. The viewing angle characteristic is a phenomenon that luminance or chromaticity changes when the screen is viewed obliquely compared with when it is viewed from the front. An IPS (In Plane Switching) system in which liquid crystal molecules are operated by horizontal electric fields has excellent viewing angle characteristics.

A method of applying an alignment treatment, that is, providing an alignment controllability to an alignment film used in the liquid crystal display device includes a rubbing treatment in the prior art. In the alignment treatment by rubbing, alignment is performed by rubbing an alignment film with a cloth. The alignment treatment also includes optical alignment method of providing the alignment controllability to an alignment film in a contactless manner. The optical alignment is applicable to the IPS system since a pre-tilt angle is not required.

JP-A-2004-206091 discloses a photolytic optical alignment treatment by irradiation of light typically represented by UV-light. JP-A-2004-206091 describes that the photolytic optical alignment can provide the following effect of:
(1) mitigating alignment disturbance due to the complicate stepped structure in a Pixel portion, and
(2) overcoming damage to thin film transistors caused by static electricity in the alignment treatment by rubbing and display failure caused by disturbance of alignment due to the disorder at the tip of the rubbing cloth or dusts, thereby overcoming complexity in the process caused by frequent replacement of the rubbing Cloth required for obtaining uniform alignment Controllability.

JP-A-2010-72011 discloses a configuration in which the upper layer of the alignment film is formed of a film having a large molecular weight and capable of efficient optical alignment while the lower layer of the alignment film is formed of a photoconductive film having a small molecular weight thereby decreasing a residual image.

SUMMARY OF THE INVENTION

However, in view of the provision of the alignment controllability to the alignment film, it has been known that the optical alignment treatment generally has lower alignment stability compared with the rubbing treatment. If the alignment stability is low, the direction of the alignment fluctuates to cause display failure. In particular, a liquid crystal display device using a lateral electric field liquid crystal display panel requires high alignment stability. If such a liquid crystal display device has low alignment stability, it tends to cause display failure typically represented by residual images.

In the optical alignment treatment, a step of stretching the main chain of a polymer into a linear shape as in the rubbing treatment is not present in an LCD process. Accordingly, in the optical alignment treatment, uniaxiality is provided to an alignment film of a synthetic polymer typically represented by a polyimide irradiated with polarized light, by disconnection of the main chain in the direction perpendicular to the direction of polarization. While the liquid crystal molecules are aligned along the direction of the remaining long main chain that extends linearly without disconnection, if the length of the main chain is short, since the uniaxiality is deteriorated and interaction with the liquid crystal molecules is weakened to deteriorate the alignment property, the residual image described above tends to be generated.

Accordingly, to improve the uniaxiality of the alignment film thereby improving the alignment stability, it is necessary to increase the molecular weight of the alignment film. To solve the problem, an optical alignment film material formed by imidizing a polyamide acid alkyl ester can be used. In the polyamide alkyl ester material, large molecular weight can be kept also without such a decomposing reaction into diamine and acid anhydride during imidizing reaction, which has occurred using the existent polyamide acid material, and alignment stability comparable with that of the rubbing treatment can be obtained.

Further, since the polyamide acid alkyl ester material does not contain a carboxylic acid in the chemical structure, the voltage holding capacity of LCD is increased and improvement in the long time reliability can also be ensured compared with the polyamide acid material.

To obtain the alignment stability and long lasting reliability of the optical alignment film, use of the polyamide acid alkyl ester material is effective but the material generally has higher specific resistivity of the alignment film compared with the polyamide acid material. Therefore, when a DC voltage is superposed on a signal waveform that drives the liquid crystal molecules to form a residual DC, a time constant till the residual DC is moderated is large, which tends to cause scorching (DC residual image).

To solve the problem, JP-A-2010-72011 describes a configuration in which a polyimide having a photoconductivity is formed from a polyamide acid as a precursor in a lower layer and a polyimide of excellent optical alignment characteristic is formed from a polyamide acid ester as a precursor in an upper layer as above.

The polyimide having the photoconductivity in the lower layer obtains the photoconductivity by the light from a backlight. However, in the liquid crystal display panel, a region which is not irradiated with the backlight is present because of the presence of interconnects, etc. The nigh resistance value in the region is kept as it is. Accordingly, presence of the region that cannot become photoconductive has caused a problem about entire deterioration in the residual image characteristic.

The present invention intends to provide a configuration that allows the residual image characteristic to be improved as an entire liquid crystal panel, by rendering accumulated charges to move easily or lowering the resistance of the alignment film also in a region not irradiated with the backlight.

To overcome the problem described above, the present invention provides the following main specific features.

(1) A liquid crystal display device including: a liquid crystal display panel where liquid crystals are put between a TFT substrate and a counter substrate, the TFT substrate having pixel electrodes formed each in a region surrounded by gate lines extending in a first direction and arranged in a second direction and data lines extending in the second direction and arranged in the first direction, the counter substrate having color filters corresponding to the pixels; and a backlight disposed at the back of the liquid crystal display panel. In the liquid crystal display device, an alignment film, is formed to cover the gate lines, the data lines, and the pixel electrodes. Further, the alignment film is subjected to an optical alignment, treatment and has a photoconductive characteristic. Still further, a photoresist is disposed below the alignment film that covers the gate lines.

(2) A liquid crystal display device including: a liquid crystal display panel where liquid crystals are put between a TFT substrate and a counter substrate, the TFT substrate having pixel electrodes formed each in a region surrounded by gate lines extending in a first direction and arranged in a second direction and data lines extending in the second direction and arranged in the first direction, the counter substrate having color filters corresponding to the pixels; and a backlight disposed at the back of the liquid crystal display panel. In the liquid crystal display device, an alignment film is formed covering the gate lines, the data lines, and the pixel electrodes. Further, the alignment film is subjected to an optical alignment treatment and has a photoconductive characteristic. Still further, the specific resistivity of the alignment film covering the gate lines in a state of putting off the backlight is lower than the specific resistivity of the alignment film covering the pixel electrodes.

(3) A method of manufacturing a liquid crystal display device including: a liquid crystal display panel where liquid crystals are put between a TFT substrate and a counter substrate, the TFT substrate having pixel electrodes formed each in a region surrounded by gate lines extending in a first direction and arranged in a second direction and data lines extending in the second direction and arranged in the first direction, the counter substrate having color filters corresponding to the pixels; and a backlight disposed at the back of the liquid crystal display panel, wherein the method includes the steps of: applying a coating of an alignment film coveting the gate lines, the data lines, and the pixel electrodes; drying the alignment film; performing baking to imidize the alignment film; performing optical alignment by applying polarized UV-light to the alignment film; performing heating after irradiation of polarized UV-light; and applying UV-light only to the alignment film covering the gate lines while heating the alignment film.

According to the present invention, since charges are rendered to be moved easily or the resistance of the alignment film is lowered in a region not irradiated with the backlight, the residual image characteristics can be improved over the entire display region. Accordingly, a liquid crystal display device of excellent image quality can be attained.

DESCRIPTION OF THE PREFERRED EMBODIMENTS

Figure 17:
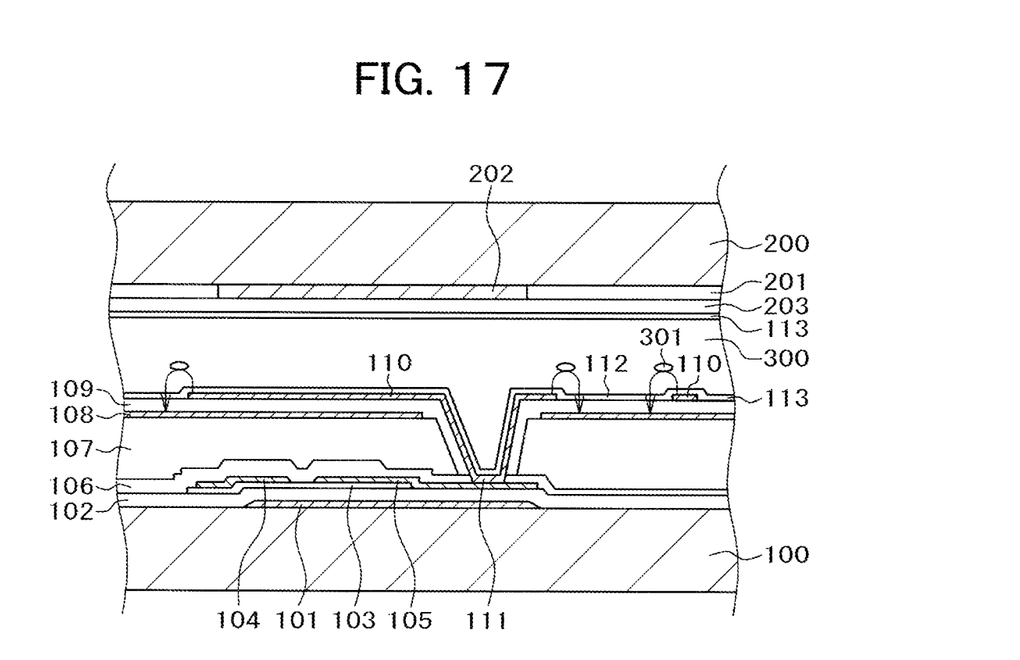
FIG. 17 is a cross sectional view of an IPS liquid crystal display device to which the invention is applied.

Before explanation of preferred embodiments of the invention, the structure of an IPS liquid crystal display device to which the present invention is applied is to be described. FIG. 17 is a cross sectional view showing a structure in a display region in an IPS liquid crystal display device. Various electrode structures of the IPS liquid crystal display device have been proposed and put to practical use. The structure of FIG. 17 is used generally at present and, referring briefly, a comb-teethed pixel electrode 110 is formed over a counter electrode 108 in a solid coated form, with an insulation film 109 being put between them. Then, liquid crystal molecules 301 are rotated by a voltage between the pixel electrode 110 and the counter electrode 108, thereby controlling the light transmittance of a liquid crystal layer 300 on every pixel to form images. The structure of FIG. 17 is to be described specifically. While the invention is described with reference to the configuration of FIG. 17 as an example, the invention is applicable also to other IPS liquid crystal display devices than that shown in FIG. 17.

In FIG. 17, a gate electrode 101 is formed over a TFT substrate 100 formed of glass. The gate electrode 101 is formed in a layer identical with that for gate lines. The gate electrode 101 comprises an AlNd alloy and an MoCr alloy stacked thereover.

A gate insulation film 102 is formed of SiN and covers the gate electrode 101. A semiconductor layer 103 is formed of an a-Si film at a position opposing the gate electrode 101 over the gate insulation film 102. The a-Si film is formed by plasma CVD. The a-Si film forms a channel portion of a TFT, in which a source electrode 104 and a drain electrode 105 are formed over the a-Si film while putting channel portion between them. A not illustrated n+Si layer is formed between the a-Si film, and the source electrode 104 or the drain electrode 105. This is formed for establishing ohmic contact between the semiconductor layer 103 and the source electrode 104 or the drain electrode 105.

The drain electrode 104 is used in common with a data line, and the drain electrode 105 is connected with a pixel electrode 110. Both the source electrode 104 and the drain electrode 105 are formed simultaneously in one identical layer. In this embodiment, the source electrode 104 or the drain electrode 105 is formed of an MoCr alloy. When it is intended to lower the electric resistance of the source electrode 104 or the drain electrode 105, an electrode structure comprising, for example, an AlNd alloy put between MoCr alloys is used.

An inorganic passivation film 106 is formed of SiN and covers the TFT. The inorganic passivation film 106 protects, particularly, the channel portion of the TFT against impurities. An organic passivation film 107 is formed over the inorganic passivation film 106. Since the organic passivation film 107 also has a function of planarizing the surface in addition to the function of protecting the TFT, the film is formed at a large thickness. The thickness is from 1 μm to 4 μm.

For the organic passivation film 107, light sensitive acrylic resin, silicon resin, polyimide resin, or the like is used. It is necessary to form a through hole 111 at a connecting portion between the pixel electrode 110 and the drain electrode 105 on the organic passivation film 107. Since the organic passivation film 107 is light sensitive, the through hole 111 can be formed by exposing and developing the organic passivation film 107 per se without using a photoresist.

A counter electrode 108 is formed over the organic passivation film 107. The counter electrode 108 is formed by sputtering ITQ (Indium Tin Oxide) as a transparent conductive film over the entire display region. That is, the Counter electrode 108 is formed in a planar Shape. After the counter electrode 108 is formed over the entire surface by sputtering, the counter electrode 108 is removed by etching only at the portion to be the through hole 111 for electrically conducting the pixel electrode 110 and the drain electrode 105.

An upper insulation film 109 is formed or SiN and covers they counter electrode 108. After the upper insulation film 109 is formed, the through hole 111 is formed by etching. The through hole 111 is formed by etching the inorganic passivation film 106 using the upper insulation film 109 as a resist. Then, ITO as the pixel electrode 110 is formed by covering the upper insulation 109 and the through hole 111 by sputtering. The pixel electrode 110 is formed by pattering the sputtered ITO. ITO as the pixel electrode 110 is deposited also in the through hole 111. The drain electrode 105 extended from the TFT and the pixel electrode 110 are electrically conducted in the through hole 111, and video signals are supplied to the pixel electrode 110.

Figure 18:
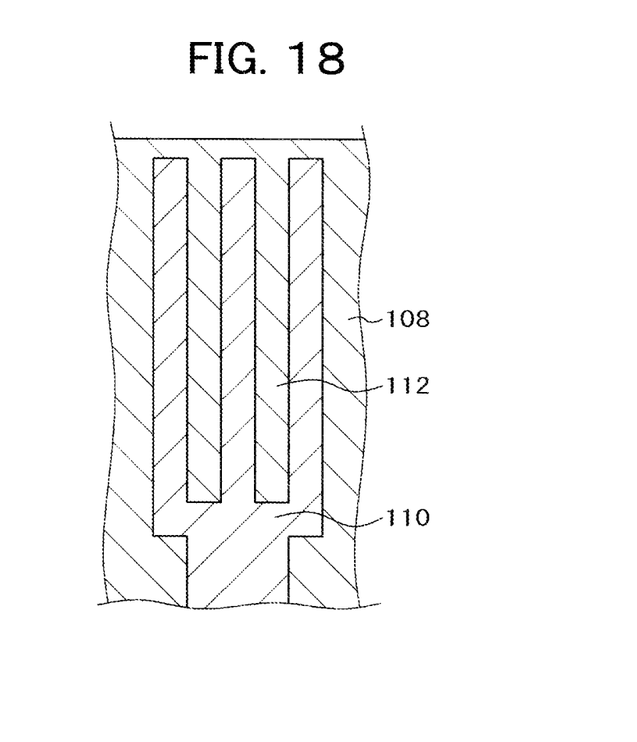
FIG. 18 is a plan view showing an example of a pixel electrode and a common electrode.

FIG. 18 shows an example of the pixel electrode 110. The pixel electrode 110 is a comb-teethed electrode. A slit 112 is formed between each of the comb-teeth. A counter electrode 108 of a planar shape is formed below the pixel, electrode 110. When video signals are applied to the pixel electrode 110, liquid crystal molecules 301 are rotated by the lines of electric force generated between the pixel electrode 110 and the counter electrode 108 through the slit 112. Thus, the light transmitting the liquid crystal layer 300 is controlled to form an image.

FIG. 17 explains the state in a cross sectional view. Adjacent comb-teethed electrodes define therebetween the slit 112 shown in FIG. 17. A constant voltage is applied to the counter electrode 108, and a voltage depending on the video signals is applied to the pixel electrode 110. When the voltage is applied to the pixel electrode 110, lines of electric force are generated and the liquid crystal molecules 301 are rotated in the direction of the lines of electric force to control the transmittance of light from a backlight. Since light transmission from the backlight is controlled on every pixel, an image is formed.

In the embodiment shown in FIG. 17, the counter electrode 108 formed in the planar shape is disposed over the organic passivation film 107 and a comb-teethed electrode 110 is disposed over the upper insulation film 109, on the contrary, a pixel electrode 110 formed in a planar shape may be disposed over the organic passivation film 107 and the comb-teeth counter electrode 108 may be disposed over the upper insulation, film 109.

An alignment film 113 for alignment of the liquid crystal molecule 301 is formed over the pixel electrode 110. As to be described later, the configuration is made different between a region of the alignment film formed over the metal interconnect such as a gate line and not irradiated with the backlight and a region of the alignment film irradiated with the backlight such as an opening portion in the invention, they are described as an identical configuration in FIG. 17.

In FIG. 17, the counter electrode 200 is disposed with the liquid crystal layer 300 being put between the counter substrate 200 and the TFT substrate. The inside of the counter substrate 200 is formed with a color filter 201. As the color filter 201, color filters 201 of red, green, and blue colors are formed on every pixel to form color Images. A black matrix 202 is formed between the color filters 201 to improve the contrast of the image. The black matrix 202 also serves as a light shielding film for the TFT thereby preventing a light current from flowing to the TFT.

An overcoat film 203 is formed covering the color filter 201 and the black matrix 202. Since the surface of the color filter 201 and the black matrix 202 is uneven, the surface is planarized by the overcoat film 203.

An alignment film 113 for determining the initial alignment of liquid crystals is formed over the overcoat film 203. Since the alignment film 113 on the side of the counter substrate gives no significant effect on the residual image characteristic, the configuration of the alignment film is not changed depending on the region as in the alignment film on the side of the TFT substrate 100.

Figure 19:
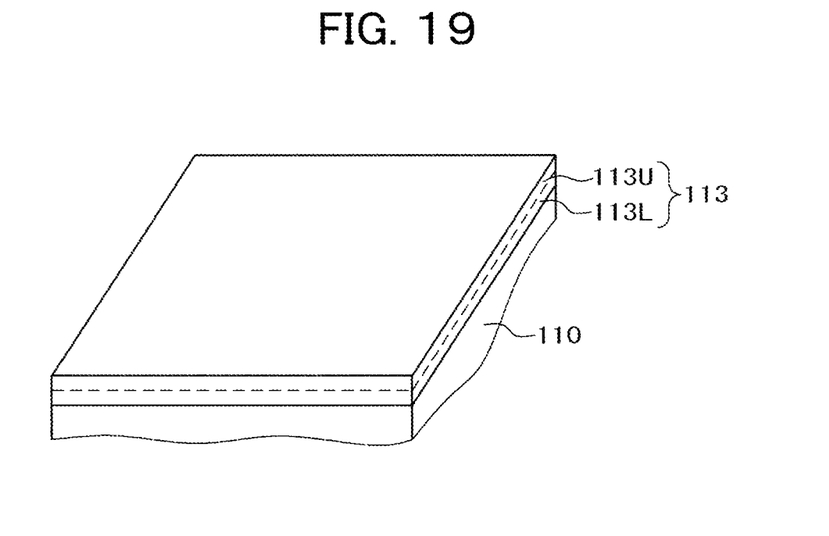
FIG. 19 shows an example of a two layer alignment film.

Also in this invention, the alignment film 113 may comprise also an upper layer alignment film 113U of excellent optical alignment Characteristic and a lower alignment film 113L having photoconductivity as shown in FIG. 19. However, in the present specification, the lower layer and the upper layer are not particularly distinguished but they are explained as having photoconductivity as the entire alignment film. Because it is considered that the alignment film entirely has the photoconductivity when the lower layer has photoconductivity. The present invention is to be described specifically by way of the following preferred embodiments.

[First Embodiment]

Figure 1:
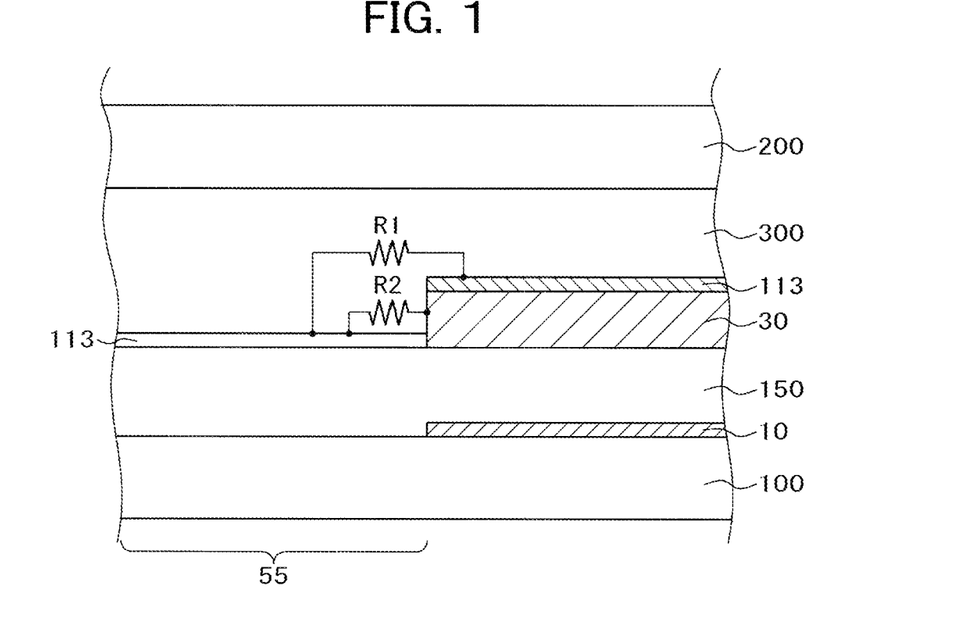
FIG. 1 is a cross sectional view showing a first embodiment of the invention.
Figure 2:
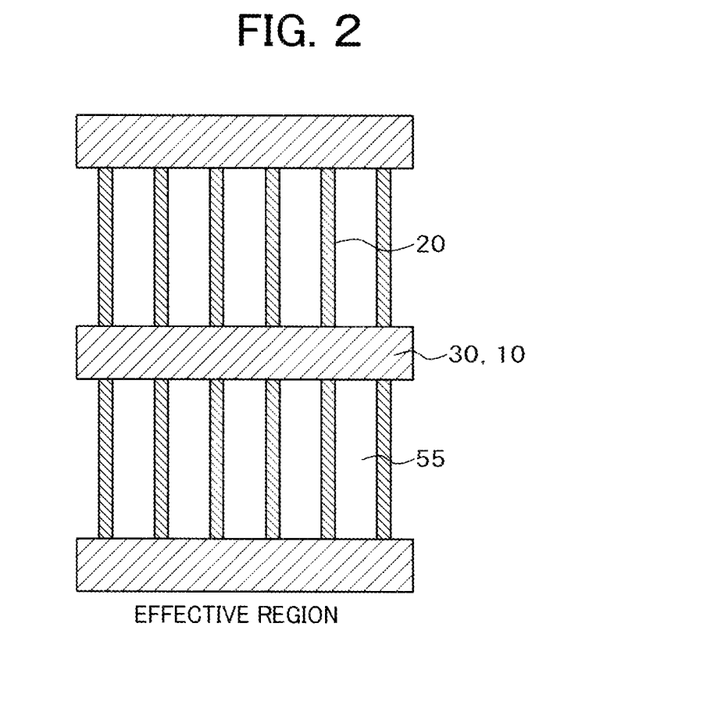
FIG. 2 is a plan view showing a first embodiment of the invention.

FIG. 1 is a cross sectional view showing a configuration of a first embodiment of the invention and FIG. 2 is a plan view of the first embodiment. Prior to explanation of FIG. 1 and FIG. 2, a mechanism that a residual image is present for a long time is to be described with reference to FIG. 3 to FIG. 6. The residual image includes a so-called DC residual image of sticking and gradual elimination of a pattern when an identical image is displayed for a predetermined pattern, and a so-called AC residual image caused by lowering of the alignment performance of the alignment film. The invention provides a countermeasure against the so-called DC residual image.

Figure 3:
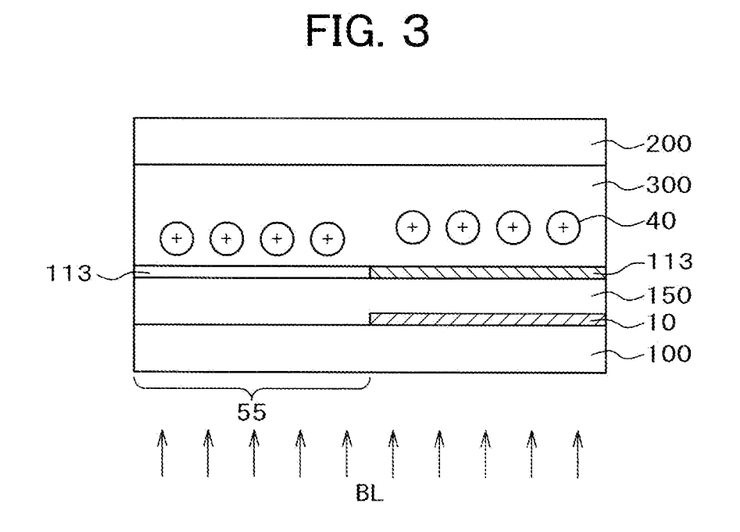
FIG. 3 is a schematic cross sectional view for explaining the mechanism of the invention.

FIG. 3 shows a state in which electric charges are accumulated on the surface of an alignment film 113 just after display of a predetermined pattern. In FIG. 3, a gate line 10 is formed over a TFT substrate 100, an intermediate layer 150 comprising various insulation layers such as a gate insulation film, an inorganic passivation film, etc. described in FIG. 17 is formed over the gate line 10 and an alignment film 113 is formed over the intermediate layer 150.

When a backlight is applied from the hack of the TFT substrate 100, the resistance of the alignment film 113 in an opening portion 55 not shielded by the gate line 10 is lowered in view of the photoconductive characteristic. On the other hand, the resistance in the portion, of the alignment film 113, shielded by the gate line 10 is not lowered since the backlight is not applied.

Figure 4:
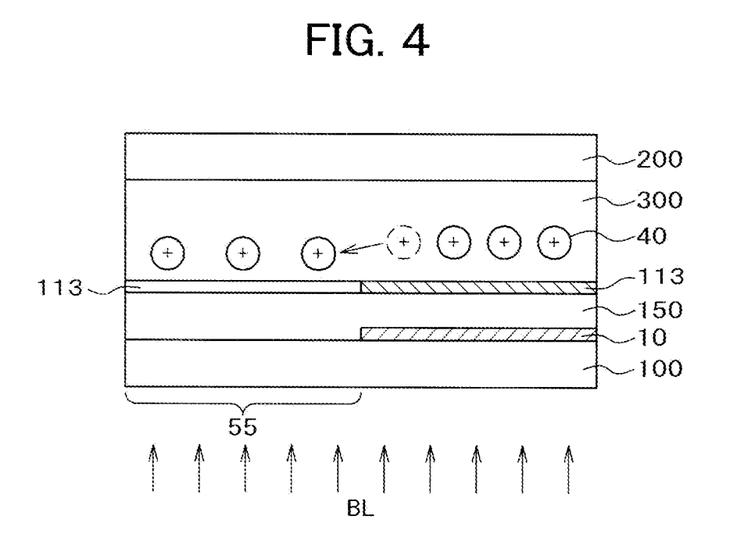
FIG. 4 is a cross sectional view showing a state succeeding to FIG. 3.

FIG. 4 is a view showing the state of accumulated charges on the alignment film 113 at elapsed time t1 after the display of a predetermined pattern in the opening portion 55 not shielded by the gate line 10, charges are eliminated soon since the resistance of the alignment film 113 not shielded by the gate line 10 is decreased by the photoconductive effect, but accumulated charges are present in the opening portion 55 since the electric charges accumulated in the portion shielded by the gate line 10 move to the opening portion 55.

Figure 5:
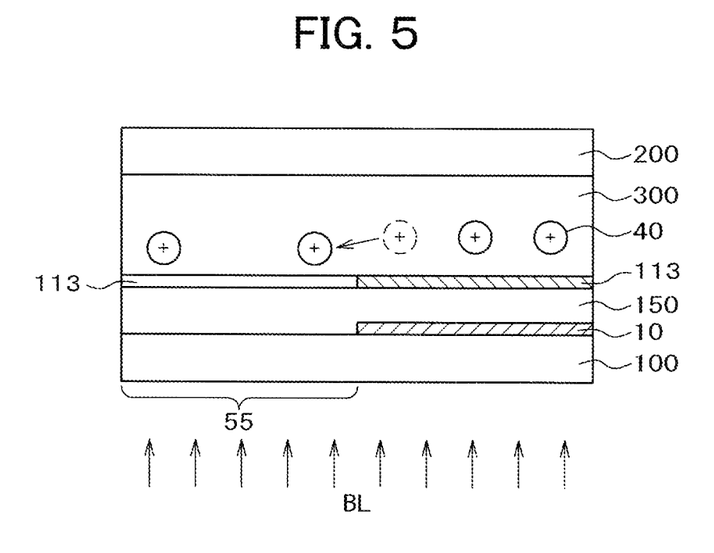
FIG. 5 is a cross sectional view showing a state succeeding to FIG. 4.

FIG. 5 is a view showing the state of the accumulated charges on the alignment film 113 when a predetermined pattern is displayed, followed by lapse of a longer time t2. Although the charges at the opening portion 55 of the alignment film 113 are eliminated in an early stage, because of lowering of the resistance due to the photoconductive effect, the charges are still present at the opening portion 55 of the alignment film 115 since the charges are supplied from the shielded, portion, to induce the phenomenon of residual image.

Figure 6:
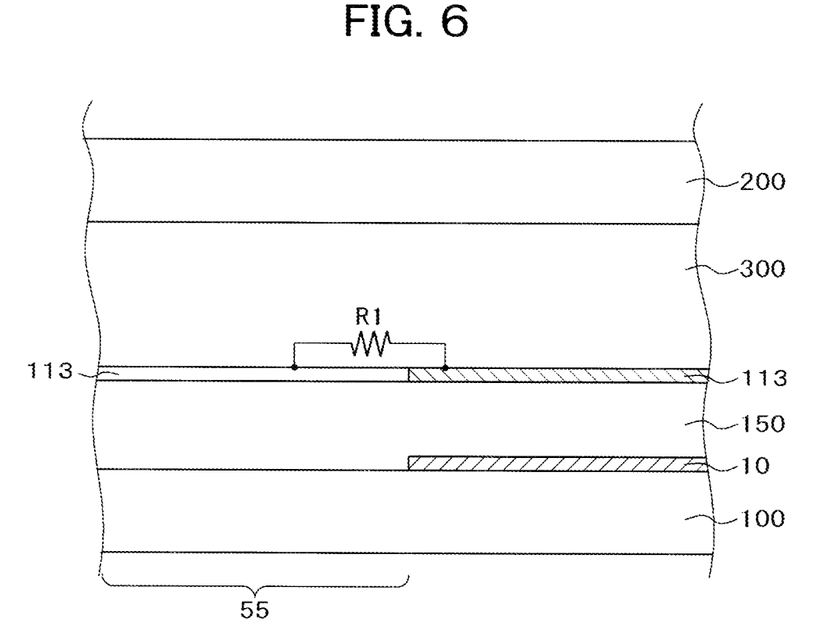
FIG. 6 is a schematic cross sectional view showing an existent embodiment.

The shielded portion has no effect on the image formation and only the opening portion 55 has a concern with the image formation. That is, long lasting residual image is caused by the transfer of the charges in the shielded portion to the opening portion 55 for a long time FIG. 6 schematically shows the phenomenon. FIG. 6 is a cross sectional view of a liquid crystal display panel having the same structure as that explained in FIG. 3.

In FIG. 6, a resistance R1 is formed between the shielded portion of the alignment film 113 and the opening portion 55 of the alignment film 113, and most of the resistance is that in the shielded portion of the alignment film 113. This is because the resistance is high in the shielded, portion since the photoconductive effect is not present. That is, when the resistance R1 is higher, transfer of the charge becomes slower and the charges are transferred from the shielded portion of the alignment film 113 to the opening portion 55 of the alignment film 113 for a long time. Accordingly, the residual image continues for a long time. This can be prevented by lowering the resistance from the shielded portion of the alignment film 113 to the opening portion 55 of the alignment filth 113.

The first embodiment of the invention shown in FIG. 1 has a configuration of promoting the flow of the charges from the shielded portion of the alignment film, 113 to the opening portion 55 of the alignment film 113 by disposing the photoresist 30 between the intermediate, layer 150 and the alignment film 113 in the shielded portion. FIG. 1, a resistance R2 is disposed between the photoresist 30 and the opening portion 55 of the alignment film 113 in parallel with the resistance R1 between the shielded portion 55 of the alignment film 113 and the opening portion of the alignment film 113. Since the photoresist 30 is, for example, as thick as 1.5 µm, the resistance R2 is lower compared with R1.

The thickness of the alignment film 113 is about 70 nm. The specific resistivity of the alignment film 113 in a state where the photoconductive effect is not present is about $10^{15}$ Ωcm and this is identical with the specific resistivity of the photoresist 30. However, since the thickness of the photoresist 30 is 20 times or more the thickness of the alignment film 113, the resistance R2 is $\frac{1}{20}$ or less of the resistance R1. Accordingly, the charges accumulated in the shielded portion transfer to the opening portion 55 in a shorter time. When the thickness of the photoresist 30 is 10 times or more the thickness of the alignment film 113, that is, when the resistance R2 is about $\frac{1}{10}$ or less of the resistance R1, the effect of the invention can be provided. The specific resistivity of the alignment film 113 in a state the photoconductive effect is present is about $10^{18}$ Ωcm.

FIG. 2 is a plan view showing a pixel configuration in a display region. In FIG. 2, gate lines 10 extend in a lateral direction and are arranged in the vertical direction. Further, data lines 20 extend in the vertical direction and are arranged in the lateral direction. A region surrounded by the gate lines 10 and the data lines 20 forms an opening portion 55, that is, a pixel, portion having a pixel electrode. In FIG. 2, TFT is not illustrated.

In FIG. 2, a photoresist 30 is formed over the gate line 10. The alignment film 113 is formed over the photoresist 30 which is formed over the opening portion 55, the data line 20, and the gate line 10. The charges from the portion, of the alignment film 113, shielded by the gate line 10 transfer rapidly under the effect of the photoresist 30 to the opening portion 55 and the lasting time of the residual image can be shortened.

In FIG. 2, since the data line 20 also forms a shielded portion, it is possible to obtain an effect of rapid transfer of the charges on the data line 20 to the pixel portion by forming the photoresist 30 also over the data line 20. However, the video signals applied on the data line 20 change the polarity on every line or on every frame because of AC driving. Accordingly, charges are less accumulated on the image signal line 20. On the other hand, since the scanning signals applied on the gate line 10 are always at an identical polarity, the charges tend to be accumulated. Accordingly, the region of the photoresist 30 is formed, most effectively, over the gate line 10.

Figure 7:
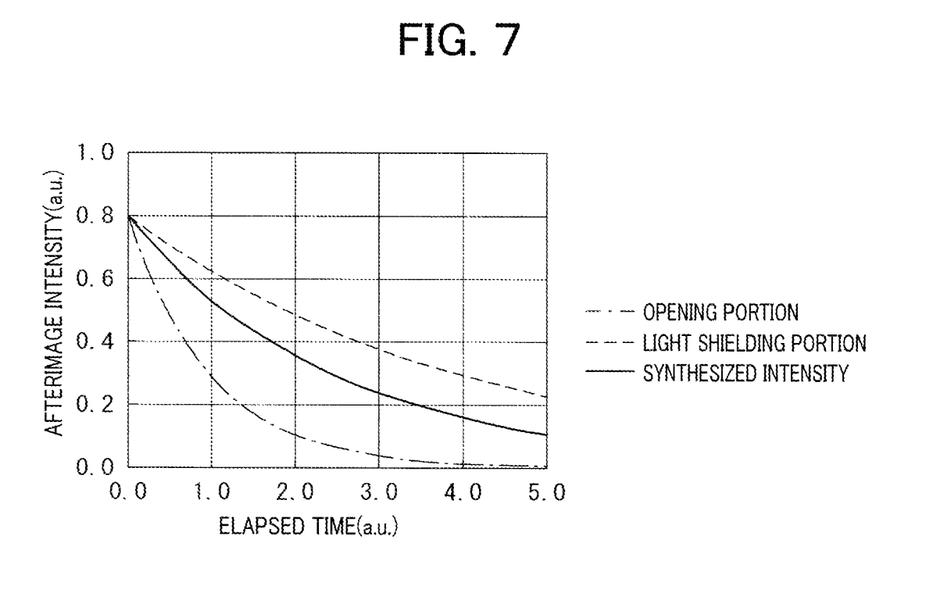
FIG. 7 is a graph for the result of simulation showing a residual image characteristic in the existent embodiment.
Figure 8:
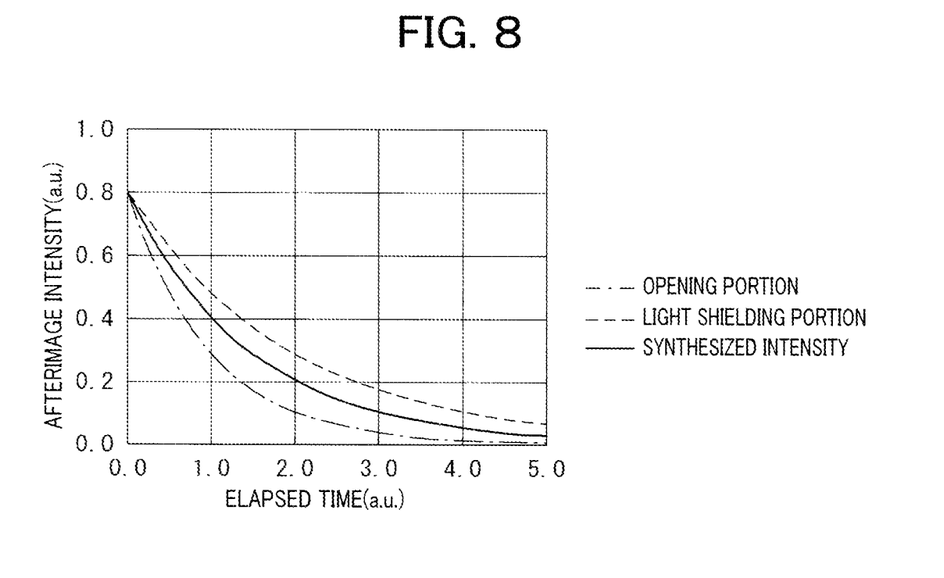
FIG. 8 is a graph for the result of simulation showing a residual image characteristic in the invention.

FIG. 7 and FIG. 8 are graphs showing the result of Simulation for residual images in comparison between the existent structure shown in FIG. 6 and the structure of the invention shown in FIG. 1. FIG. 7 corresponds to the existent embodiment in FIG. 6 and FIG. 8 corresponds to the embodiment of the invention in FIG. 1. In FIG. 7 and FIG. 8, the time is indicated on the abscissa and the intensity of the residual image is indicated on the ordinate. The intensity of the residual image is equivalent to the amount of the residual charges in the opening portion. The unit used in the simulation is arbitrary. Simulation is performed assuming that the area is identical between the shielded portion and the opening portion.

In FIG. 7 and FIG. 8, a dotted chain line, shows the effect of the charges accumulated only in the opening portion on the residual image. Since the opening portion has an identical configuration between FIG. 6 and FIG. 1, the lasting time of the residual image due to the charges accumulated only in the opening portion is identical. In FIG. 7 and FIG. 8, a dotted line shows the effect of the charges accumulated only in the shielded portion on the residual image. In the existent embodiment shown in FIG. 7, since the charges accumulated only in the shielded portion transfer for a long time to the display region, the residual image remains for a long time. On the other hand, in the invention shown in FIG. 8, since the charges accumulated only in the shielded portion rapidly transfer to the opening portion due to the effect of the photoresist, the residual image is eliminated soon.

In FIG. 7 and FIG. 8, the actual residual image is a synthesized effect of charges accumulated only in the opening portion and the charges accumulated only in the shielded portion. Solid lines in FIG. 7 and FIG. 8 are curves showing the actual residual images. The actual residual image in the invention shown in FIG. 8 is eliminated more rapidly compared with the residual image in the existent embodiment shown in FIG. 7. That is, according to the effect of the invention in FIG. 8, the actual residual image can be eliminated in an early stage due to the effect of the photoresist framed in the shielded portion.

Figure 9:
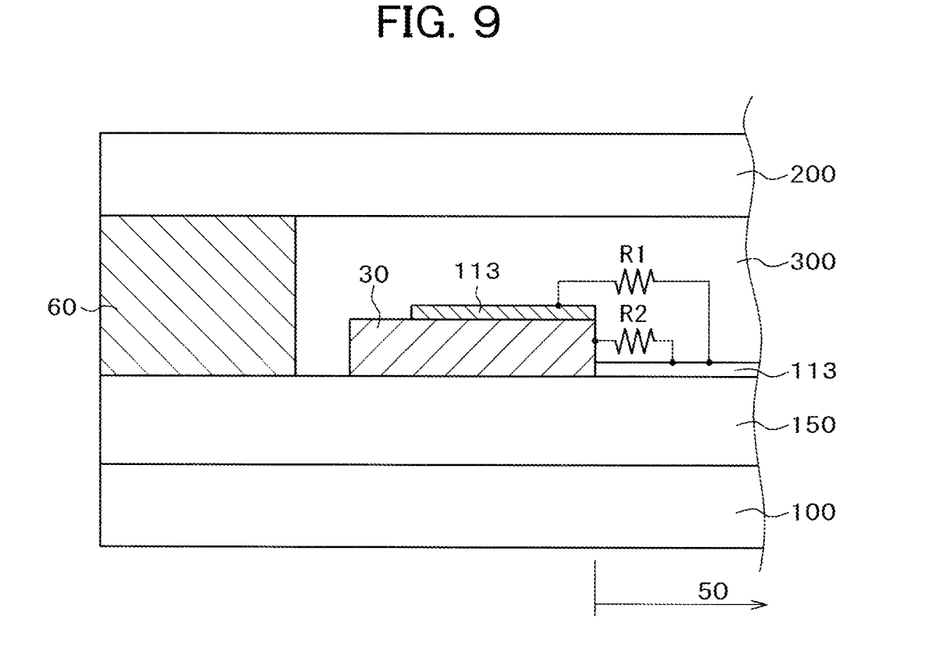
FIG. 9 is a schematic cross sectional view showing another configuration of the first embodiment.

FIG. 9 is a cross sectional view showing a peripheral portion of a display region of the liquid crystal display panel in the first embodiment. In FIG. 9, an intermediate layer 150 is formed over a TFT substrate 100, and an alignment film 113 is formed thereover. The TFT substrate 100 is bonded to the counter substrate 200 by means of a sealant 60 and a liquid crystal layer 300 is put between the TFT substrate 100 and a counter substrate 200. The outside of a display region 50 is formed with leads for the gate line 10 and the data line 20 and forms a shielded region against light from a backlight. Accordingly, since a photoconductive effect cannot be obtained in the portion of the alignment film 113, the resistance is high. Then, charges accumulated on a portion of the alignment film 113, which is formed outside of the display region 50, transfer to the display region 50 over a long time to induce the residual image.

In FIG. 9, the photoresist 30 is disposed over the intermediate layer 150 and the alignment film 113 is formed thereover to the outside of the display region 50 Since the photoresist 30 is formed with a thickness of about 1.5 μm, the resistance R2 between the alignment film 113 and the photoresist 30 in the display region 50 can be lowered and, as a result, since the charges accumulated to the outside of the display region 50 can transfer rapidly to the display region 50, the lasting time of the residual image can be shortened. Therefore, according to the configuration of FIG. 9, the phenomenon at the periphery of residual image in the display region can be moderated.

Figure 10:
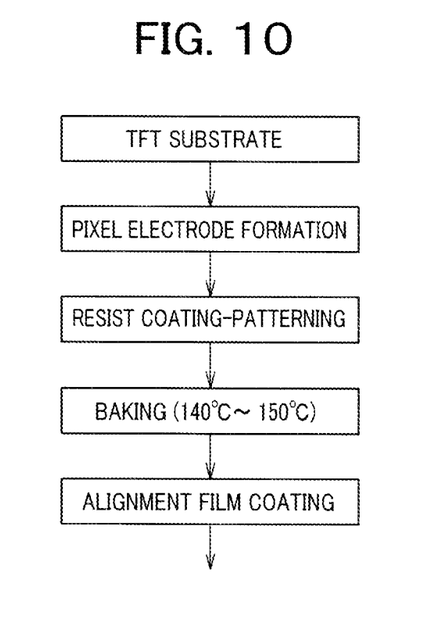
FIG. 10 is a view showing manufacturing steps of the first embodiment.

FIG. 10 is a view showing a process for obtaining the configuration of the first embodiment. In FIG. 10, manufacturing procedures up to the formation of the pixel electrode over the TFT substrate are identical with those in the previous existent embodiment. After the pixel electrode is formed, a resist is coated and patterning is performed. Since the resist is loft only in the shielded portion, effect of transparency, etc. cases no problem. Accordingly, a relatively inexpensive resist such as a phenol novolac type can be used for the resist material. After the resist is patterned and the resist is left only in the shielded portion, baking is performed, at 140° C. to 150° C. Subsequently, an alignment film is coated. The subsequent Steps are identical with those of the existent embodiment.

For the effect on the residual image, since the state of the alignment, film on the side of the TFT substrate is predominant, it is not always necessary to form the photoresist in the shielded portion of the alignment film of the counter substrate for lowering the specific resistivity.

[Second Embodiment]

Figure 11:
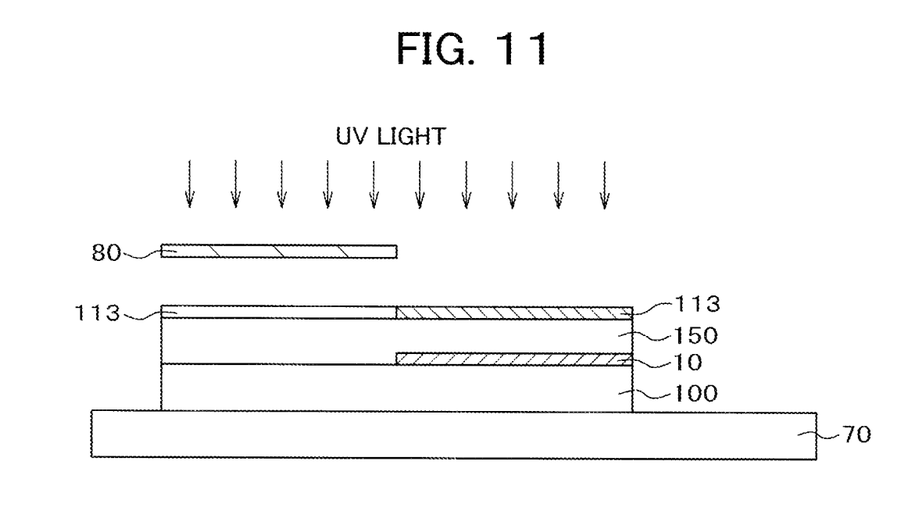
FIG. 11 is a cross sectional view showing a configuration of a second embodiment.
Figure 12:
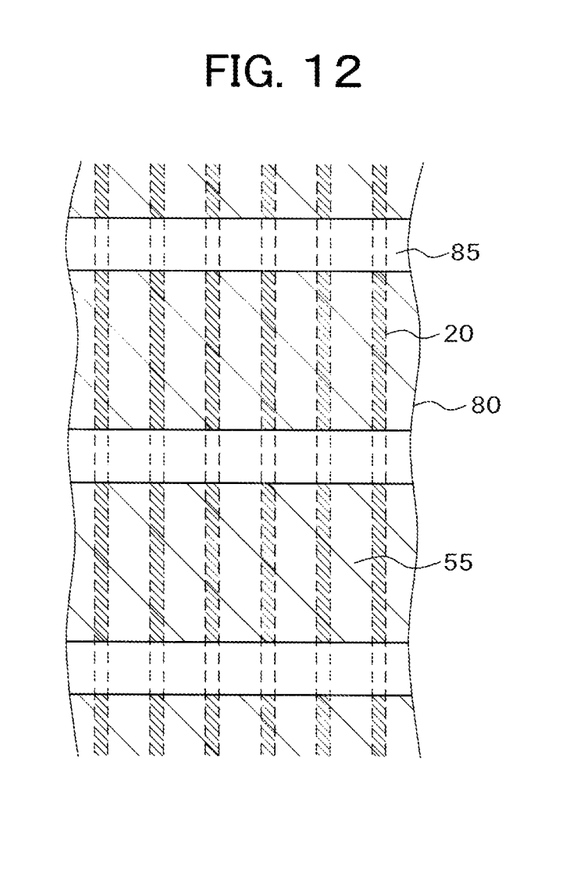
FIG. 12 is a plan view Showing a configuration of a second embodiment.

FIG. 11 is a cross sectional view showing a configuration of a second embodiment of the invention in a display region and FIG. 12 is a plan view thereof. In the existent embodiment shown in FIG. 6, since no photoconductive effect is obtainable in the shielded portion of the alignment film 113, a problem exists in that the charges accumulated in the shielded portion cannot rapidly transfer to the opening portion due to high resistance. This embodiment has a feature of originally lowering the resistance in the shielded portion of the alignment film 113, even though the photoconductive effect cannot be obtained.

In the configuration of the second embodiment shown in FIG. 11, after an alignment film 113 is formed, an opening portion 55 is shielded by using a photomask 80 and UV-light is applied only to the shielded portion. A TFT substrate 100 formed with the alignment film 113 is placed over a hot plate 70 and the substrate is heated to 200° C. to 210° C. at the same time with irradiation of UV-light. As described above, by irradiation of the UV-light to the shielded portion of the alignment film 113 under heating, the structure in the shielded portion of the alignment film 113 is changed and the specific resistivity of the alignment film can be decreased. On the other hand, since the UV-light is not applied to the opening portion 55 of the alignment film 113, the property of the alignment film 113 does not change and also the alignment performance does not change. Since the shielded, portion is not an image display portion, if the alignment film 113 is denatured and the alignment performance is deteriorated, this gives no effect on the image characteristic.

Since the UV-light is used for denaturing the alignment film 113, use of not polarized. UV-light of deep UV (wavelength 300 nm or less) is most effective. However, for the simplification of the manufacturing apparatus, polarized UV-light used for the optical alignment can be used again. That is, linearly polarized UV-light at a wavelength of 240 nm to 400 nm can also be used. However, it is difficult to perform the UV-light irradiation simultaneously with optical alignment. This is because it is essential to perform UV-light irradiation simultaneously with heating of the substrate in this embodiment. For example, when polarized UV-light at a wavelength, for example, of 250 nm is used, the specific resistivity of the alignment film was decreased to ⅔ when the substrate was heated to 200° C., and the specific resistivity of the alignment film was decreased to ½ when the substrate was heated to 230° C.

Whether the irradiation of UV-light was conducted twice or not can be discriminated by irradiation of infrared light to the alignment film and evaluating the absorption spectrum thereof. That is, in the alignment film in which the shielded portion is irradiated twice with the UV-light, the number of polyimide rings is decreased. As a result, the absorption spectrum for infrared light is different.

FIG. 12 is a plan view of this embodiment. FIG. 12 is a plan view in a state where a photomask 80 is disposed over a TFT substrate 100 formed with the alignment film 113. In FIG. 12, photomask holes 85 are formed in the photomask 80 at a portion, of the TFT substrate 100, corresponding to the gate line 10. That is the UV-light is applied only to the alignment film 113 over the gate line 10. Accordingly, the alignment film 113 is denatured and the specific resistivity is decreased only in the portion ever the gate line 10.

In FIG. 12, the photomask holes 85 are formed only over the gate lines 10, but the photomask holes 85 may be formed, also over the data lines 20 thereby denaturing the alignment film 113 over the data lines 20. However, concerning the effect of lowering the resistance of the alignment film 113, that is larger in the alignment film 113 over the gate line 10, as has been described in the first embodiment.

Figure 13:
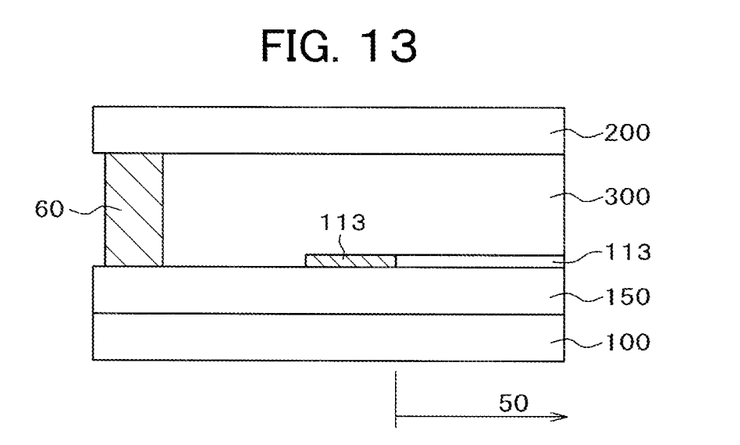
FIG. 13 is a cross sectional view showing another configuration of the second embodiment.

FIG. 13 is a cross sectional view of the liquid crystal, display panel in the second embodiment. In FIG. 13, an alignment film 113 is formed over an intermediate layer 150 formed above a TFT substrate 100. A counter electrode 200 is bonded with the TFT substrate 100 by means of a sealant 60. A liquid crystal 300 ds put between the TFT substrate 100 and the counter substrate 200. The resistance of the alignment film 113 is lowered in the display region 50 receiving the light from a backlight. On the other hand, the outside of the display region 50 is a shielded region under the effect of leads for the gate lines 10, the data lines 20, etc. and, since the photoelectric effect is not caused in the portion of the alignment film 113, the resistance is high.

In this embodiment, the specific resistivity is decreased by irradiation of the UV-light to the alignment film 113 outside of the display region 50 while heating the substrate, so that the charges can rapidly transfer from the shielded region to the display region 50. Thus, the residual image in the periphery of the display region 50 can be eliminated in the early stage.

Figure 14:
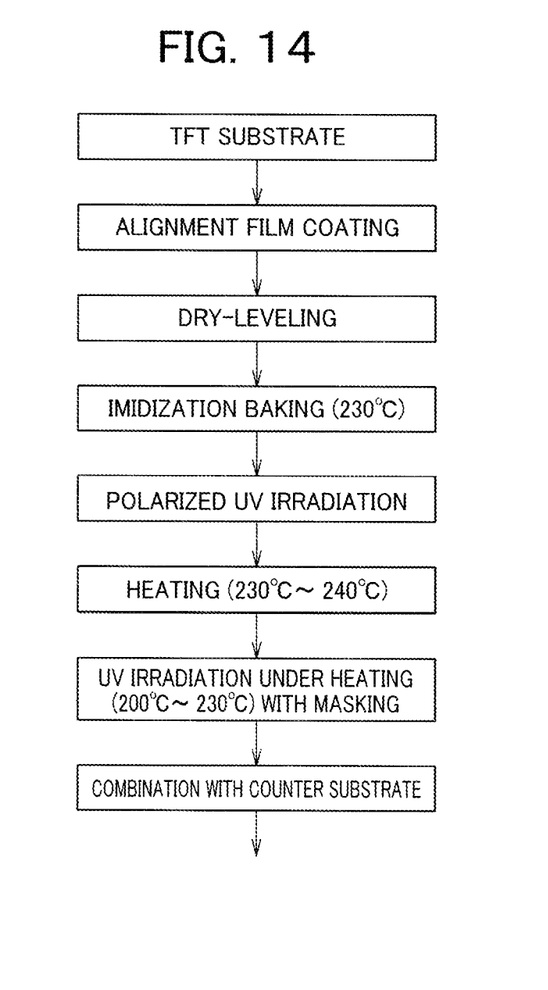
FIG. 14 is a view showing manufacturing steps for the second embodiment.

FIG. 14 is a view showing a process for obtaining the configuration of this embodiment. In FIG. 14, coating of an alignment film is applied to a TFT substrate which is fabricated to a state where the pixel electrode is formed. Then, the alignment film is dried and leveled to form a uniform film. Subsequently, imidization is Performed by baking at 230° C. Then, optical alignment is performed by irradiation of linearly polarized UV-light at a wavelength of 230 nm to 400 nm. Then, heating is applied at 230° C. to 240° C. to vaporize a monomer of phenylen bismaleimide, etc. to improve the alignment property. Subsequently, UV-light is applied only to the shielded portion in the TFT substrate by using a photomask to decrease the specific resistivity in the portion of the alignment film. At the same time with the UV-light irradiation, the substrate is heated at 200° C. to 230° C. Then, the substrate is combined with a counter substrate to form a liquid crystal display panel. For the effect on the residual image, since the state of the alignment film on the side of the TFT substrate is predominant, it is not always necessary to perform a process for irradiating the counter suns-orate with the UV-light in order to decrease the specific resistivity of the alignment film.

Figure 15:
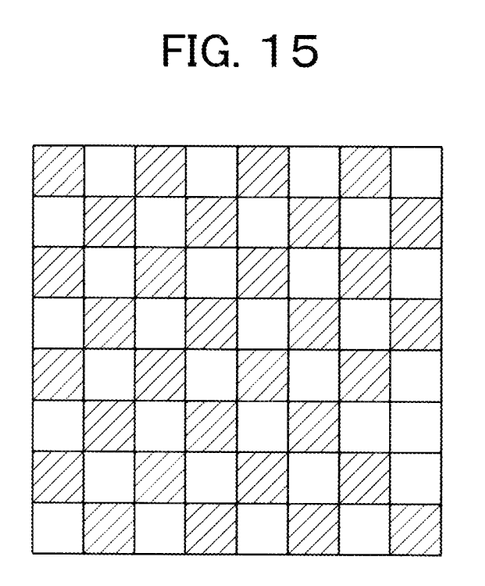
FIG. 15 is a pattern for evaluating residual images.

The effect of the invention on the DC residual image can be confirmed by using a 8×8 black and white checker flag pattern as shown in FIG. 15. That is, a 8×8 black and white checker flag pattern as shown in FIG. 15 is displayed for 12 hours and then returned to a gray solid half tone. The gradation of the half tone is 64/256.

Figure 16:
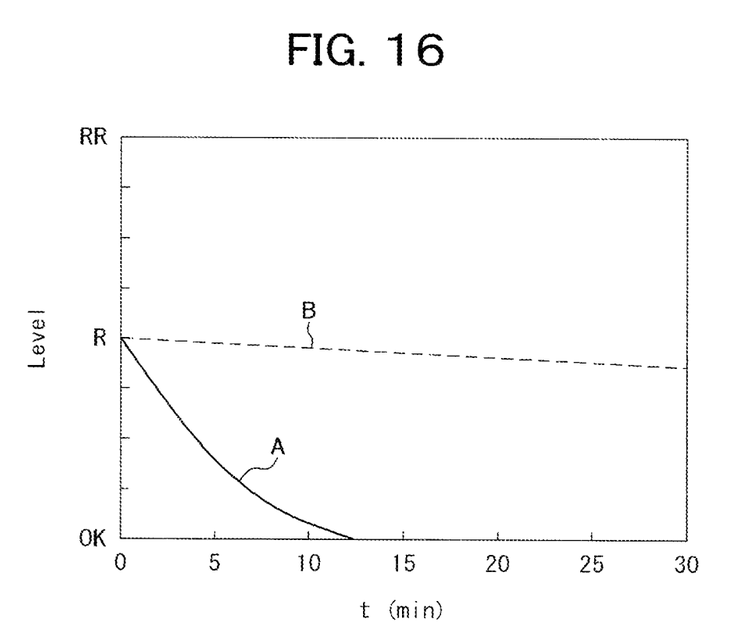
FIG. 16 is a graph showing residual image characteristic in comparison between the invention and the existent embodiment.

FIG. 16 shows a result of evaluation for the DC residual image in FIG. 16, the abscissa snows a time after returning to the gray solid half ton. The ordinate represents a level of the residual image. In the ordinate, RR represents a state where the checker flag pattern is Observed distinctly when display is returned to a gray solid half tone, which is not preferred. R represents a state where the checker flag pattern can be seen although vaguely when display is returned to the half tone. In FIG. 16, a curve A shows the DC residual image characteristic when an alignment film according to the invention is used. A curve B shows a residual image characteristic when an alignment film not provided with photoconductive effect is used.

Even when the residual image is at the level R when returned to the half tone, if the residual image disappears in a Short time, it can be said that there is no practical problem. In the curve B showing a case where an alignment film, not provided with the photoconductive effect is used, since the level R when returned to the half tone continues for a long time, a practical, problem remains. On the other hand, according to the configuration of the alignment film of the invention, the DC residual image is decreased abruptly and, after returned to the half tone, the DC residual image is eliminated completely in about 13 minutes.

When the levels of the DC residual image are compared at the time of 10 minutes later after returned to the intermediate level as a guide for the DC residual image, in a case where the alignment film consists of only one layer of optical alignment film, it can be seen, that the DC residual image is 90% whereas the DC residual image is decreased to 10% or less in the invention and the effect of the invention is significantly good.

What is claimed is:

1. A liquid crystal display device comprising:
a liquid crystal display panel where liquid crystals are put between a TFT substrate and a counter substrate, the TFT substrate having pixel electrodes formed each in an opening region surrounded by gate lines and data lines, and
a backlight disposed at the back of the liquid crystal display panel, wherein
an alignment film is formed to cover the gate lines, the data lines, and the pixel electrodes,
the alignment film is subjected to an optical alignment treatment,
the alignment film has a photoconductive characteristic,
a photoresist is disposed below the alignment film that covers the gate lines in a non-opening region,
an edge of the photoresist contacts the alignment film formed in the opening region, and
a top of the photoresist contacts the alignment film formed in the non-opening region.

2. The liquid crystal display device according to claim 1, wherein the thickness of the photoresist is 10 times or more the thickness of the alignment film.

3. The liquid crystal display device according to claim 2, wherein the thickness of the photoresist is 20 times or more the thickness of the alignment film.

4. The liquid crystal display device according to claim 1, further comprising an organic passivation film disposed below the photoresist.

5. The liquid crystal display device according to claim 1, wherein the alignment film is formed by imidizing a polyamide alkyl ester material.

6. The liquid crystal display device according to claim 1, wherein an inorganic passivation film is disposed below the photoresist.

7. The liquid crystal display device according to claim 6, wherein the inorganic passivation film is SiN.

8. The liquid crystal display device according to claim 1, wherein a specific resistivity of the photoresist is lower than a specific resistivity of the alignment film in the non-opening region.

* * * * *

UNITED STATES PATENT AND TRADEMARK OFFICE
CERTIFICATE OF CORRECTION

PATENT NO. : 9,086,591 B2  
APPLICATION NO. : 13/675417  
DATED : July 21, 2015  
INVENTOR(S) : Matsui et al.

Page 1 of 3

It is certified that error appears in the above-identified patent and that said Letters Patent is hereby corrected as shown below:

In The Specification

Column 1, line 10, change "JP 2011-2535287" to --JP 2011-253587--;

Column 1, lines 35-36, change "DEC (Digital. Still Cameras)" to --DSC (Digital Still Cameras)--;

Column 1, line 60, change "Pixel" to --pixel--;

Column 1, line 66, change "Cloth" to --cloth--;

Column 1, line 67, change "Controllability" to --controllability--;

Column 3, lines 25-26, change "alignment, treatment" to --alignment treatment--;

Column 3, line 56, change "coveting" to --covering--;

Column 5, line 43, change "ITQ (Indium Tin Oxide)" to --ITO (Indium Tin Oxide)--;

Column 5, line 44, change "Counter" to --counter--;

Column 5, line 45, change "Shape" to --shape--;

Column 5, line 50, change "or SiN" to --of SiN--;

Column 5, line 51, change "they counter" to --the counter--;

Column 5, line 66, change "pixel, electrode" to --pixel electrode--;

Column 6, line 23, change "insulation, film" to --insulation film--;

Column 6, line 37, change "Images" to --images--;

Column 6, line 55, change "Characteristic" to --characteristic--;

Signed and Sealed this  
Fifteenth Day of December, 2015

Michelle K. Lee  
*Director of the United States Patent and Trademark Office*

CERTIFICATE OF CORRECTION (continued)
U.S. Pat. No. 9,086,591 B2

Column 7, line 18, change "hack" to --back--;

Column 7, line 41, change "alignment film 115" to --alignment film 113--;

Column 7, line 42, change "shielded, portion" to --shielded portion--;

Column 7, line 56, change "shielded, portion" to --shielded portion--;

Column 7, line 64, change "alignment filth 113" to --alignment film 113--;

Column 7, line 67, change "film, 113" to --film 113--;

Column 8, line 3, change "FIG. 1, a" to --In FIG. 1, a--;

Column 8, line 24, change "1018 Ωcm" to --10 13 Ωcm--;

Column 8, line 31, change "pixel, portion" to --pixel portion--;

Column 8, lines 52-53, change "Simulation" to --simulation--;

Column 9, line 22, change "framed" to --formed--;

Column 9, line 57, change "loft" to --left--;

Column 9, line 58, change "cases" to --causes--;

Column 9, line 63, change "Steps" to --steps--;

Column 9, line 66, change "alignment, film" to --alignment film--;

Column 10, line 29, change "shielded, portion" to --shielded portion--;

Column 10, line 34, change "polarized. UV-light" to --polarized UV-light--;

Column 10, line 61, change "That is the UV-light" to --That is, the UV-light--;

Column 10, line 64, change "ever" to --over--;

Column 10, lines 66-67, change "formed, also" to --formed also--;

Column 11, line 10, change "300 ds put" to --300 is put--;

Column 11, line 29, change "Performed" to --performed--;

Column 11, line 43, change "suns-orate" to --substrate--;

Column 11, line 53, change "image in FIG. 16" to --image. In FIG. 16--;

Column 11, line 54, change "ton" to --tone--;

Column 11, line 56, change "Observed" to --observed--;

CERTIFICATE OF CORRECTION (continued)
U.S. Pat. No. 9,086,591 B2

Column 12, line 3, change "Short" to --short--;

Column 12, line 4, change "film, not" to --film not--;

Column 12, line 7, change "practical, problem" to --practical problem--; and

Column 12, line 16, change "seen, that" to --seen that--.